(12) United States Patent
Nakagawa et al.

(10) Patent No.: US 8,620,117 B2
(45) Date of Patent: Dec. 31, 2013

(54) OPTICAL DEVICE, OPTICAL DEFLECTION DEVICE, AND OPTICAL MODULATION DEVICE

(71) Applicants: Jun Nakagawa, Yokohama (JP);
Tsuyoshi Hashiguchi, Yokohama (JP);
Kazuhiko Tsukamoto, Yokohama (JP)

(72) Inventors: Jun Nakagawa, Yokohama (JP);
Tsuyoshi Hashiguchi, Yokohama (JP);
Kazuhiko Tsukamoto, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/705,544

(22) Filed: Dec. 5, 2012

(65) Prior Publication Data
US 2013/0142473 A1    Jun. 6, 2013

(30) Foreign Application Priority Data
Dec. 6, 2011   (JP) .................................. 2011-266701

(51) Int. Cl.
*G02F 1/035*    (2006.01)

(52) U.S. Cl.
USPC .................................... 385/3; 385/8; 359/245

(58) Field of Classification Search
USPC .......... 385/1–10; 359/237, 238, 240, 241, 245
See application file for complete search history.

(56) References Cited

U.S. PATENT DOCUMENTS

| 5,802,223 | A | 9/1998 | Nashimoto |
| 5,815,610 | A * | 9/1998 | Tokano et al. ..................... 385/2 |
| 6,684,013 | B2 | 1/2004 | Seki et al. |
| 6,782,152 | B2 * | 8/2004 | Mohtat et al. ................... 385/15 |
| 6,975,782 | B2 * | 12/2005 | Maki et al. ......................... 385/8 |
| 2012/0155824 | A1 | 6/2012 | Suzuki et al. |

FOREIGN PATENT DOCUMENTS

| JP | 7-244307 | 9/1995 |
| JP | 9-005797 | 1/1997 |
| JP | 2001-337302 | 12/2001 |
| JP | 2003-084326 | 3/2003 |

* cited by examiner

*Primary Examiner* — Daniel Petkovsek
(74) *Attorney, Agent, or Firm* — Oblon, Spivak, McClelland, Maier & Neustadt, L.L.P.

(57) ABSTRACT

An optical device includes a phase modulation element having an optical waveguide part and electrodes, the optical waveguide part being configured such that a laser light beam emitted by a laser light source is inputted to the optical waveguide part and having an optical waveguide layer formed of an electro-optic material, the electrodes being provided on respective sides of the optical waveguide part to apply a voltage to the optical waveguide layer, the phase modulation element being configured to modulate a phase of the laser light beam by using a refraction index modulation region formed in the optical waveguide layer when a voltage is applied to the optical waveguide layer through the electrodes, and a pump light source configured to irradiate at least the refraction index modulation region of the optical waveguide layer with a pump light beam.

9 Claims, 16 Drawing Sheets

FIG.9B
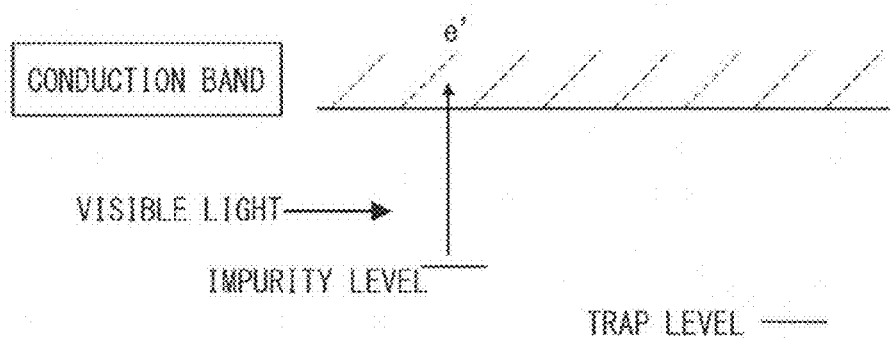
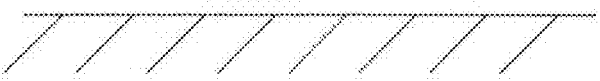

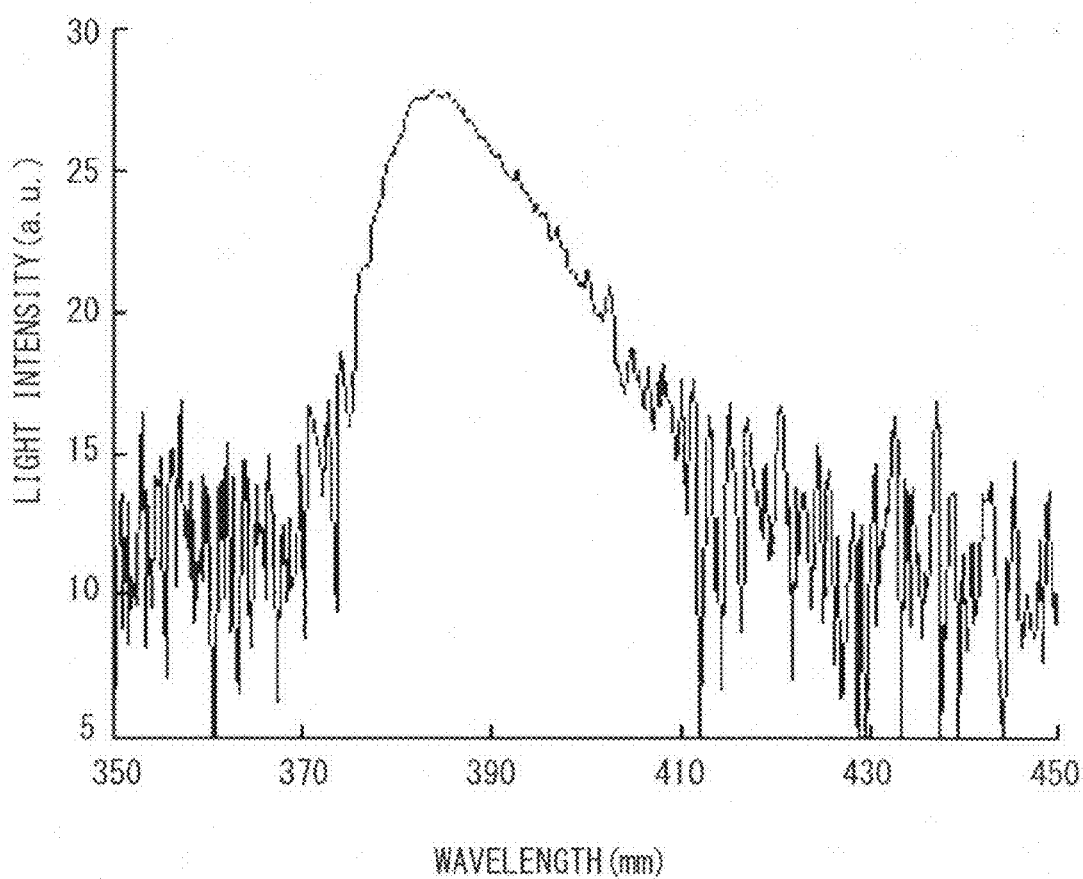

OPTICAL DEVICE, OPTICAL DEFLECTION DEVICE, AND OPTICAL MODULATION DEVICE

PRIORITY CLAIM

The present application is based on and claims priority from Japanese Patent Application No. 2011-266701, filed on Dec. 6, 2011, and Japanese Patent Application No. 2012-220054, field on Oct. 2, 2012, the disclosures of which are hereby incorporated by reference in their entirety.

BACKGROUND

1. Field of the Invention

The present invention relates to an optical device, an optical deflection device, and an optical modulation device which include a phase modulation element having: an optical waveguide layer which is formed of an electro-optic material and to which a laser light beam is inputted; and electrodes through which a voltage is applied to the optical waveguide layer to form a refractive index modulation region of the laser light beam.

2. Description of the Related Art

Optical devices, such as an optical deflection device, e.g., an optical beam scanner configured to perform scan with a laser beam (i.e., a laser light beam) and an optical modulation device configured to adjust the intensity of a laser beam, are used in a variety of fields, including a laser printer, laser processing, a display, measurement, optical communication, and the like.

Generally, the optical beam scanner includes a lasing device as a light source and an optical deflection element configured to perform scan with a laser beam. If necessary, the optical beam scanner may further include: a light coupling optical system configured to shape an optical beam (i.e., a laser beam) emitted by the laser light source into a beam having a shape suitable for an optical beam deflection element (i.e., an optical deflection element); and/or an output optical system configured to, for example, shape the profile of an optical beam outputted from the optical beam deflection element or to increase or decrease the deflection angle of the optical beam given by the optical beam deflection element.

Conventionally, general types of the optical beam deflector (i.e., optical beam deflection element) include not only one for performing optical scanning through control of the reflection angle of an optical beam, such as a rotating polygon mirror, a galvanometer mirror, and an MEMS mirror, but also one that utilizes a change in the refractive index of a material, the change being caused by an acousto-optical (AO) effect or an electro-optical (EO) effect.

Among these, the EO effect offers a very high response speed in principle, and therefore an optical beam deflection element formed of an electro-optic material is useful in high-speed beam scanning. Further, since the scan angle can be controlled according to the voltage applied to the EO material, a desired deflection angle can be instantly given to the optical beam.

An element formed of an electro-optic material is used in various fields (e.g., Japanese Patent No. 3704553 as well as Japanese Patent Application Publication Nos. 2001-337302, Hei 9-5797, and Hei 7-244307). However, optical damage, i.e., photorefraction is generally known as a problem caused when such an element is used as an optical waveguide layer by inputting a laser light beam into the element. Photorefraction is a phenomenon in which, when a high energy optical beam is applied to a material, the shape of the optical beam is largely distorted. Photorefraction is thought to be caused when free electrons, generated inside an electro-optical material by optical energy excitation, drift to form a random internal electric field inside the electro-optic material, or when the internal electric field formed by the free electrons causes an irregular change in the refractive index inside the electro-optic material by the electro-optic effect.

Photorefraction can be noticeably observed in an optical device in which an element formed of an electro-optic material is used as an optical deflector (i.e., optical beam deflector). The reason for this is as follows. The wavelength and the light intensity of a light source of an optical device vary depending on the intended use of the optical device, and a laser light source with a high intensity from several hundreds of mW to 1 W or higher is selected particularly for an optical device in which a laser beam is inputted to an optical deflector and which is used for laser processing or distance measurement with a laser radar or for laser projection.

To solve the problem of photorefraction, attempts have been made to optimize the composition of an electro-optic material. For example, lithium niobate and the like are known as a general electro-optic material or non-linear optical material. These materials have poor resistance to photorefraction. Accordingly, when used for a wavelength conversion element, these materials are doped with a metal material such as magnesium or iron in order, for example, to be able to support output of a short-wavelength laser beam such as a green laser. As described, it is known to increase the resistance of a material to photorefraction by doping the material with an appropriate amount of magnesium or the like to increase the photoconductivity of the material and thereby to decrease the internal electric field formed by photoexcited carriers. Another countermeasure against photorefraction proposed is to apply an ultraviolet light beam to the wavelength conversion device (see, for example, Japanese Patent No. 3704553).

Accordingly, also in a case of an optical deflection element used in the optical beam scanner, if the optical deflection element is formed of an electro-optic material, it is effective to use an electro-optic material excellent in resistance to photorefraction, depending on the light intensity of the scanning laser beam. This is true not only for an optical deflection device such as an optical beam scanner, but also for an optical modulation device.

However, in an optical deflector or optical modulator in which magnesium-doped lithium niobate is used as an electro-optic material for an optical waveguide layer, when a refractive index modulation region of a laser light beam is formed by application of a voltage to the optical waveguide layer, the profile of an optical beam propagating inside the optical waveguide layer has been observed to be largely distorted. This problem of beam shape distortion is especially noticeable in DC voltage operation. This is because, when a voltage is continued to be applied with always the same polarity, drifting of carriers by an external electric field are promoted to form a local electric field distribution in the refractive index modulation region.

In an optical deflector, this beam distortion greatly decreases performance such as the number of resolvable spots. In an optical modulator, the beam distortion decreases an extinction ratio.

In view of the above problems, in an optical device including a phase modulation element having: an optical waveguide layer which is formed of an electro-optic material and into which a laser light beam is inputted; and electrodes through which a voltage is applied to the optical waveguide layer to form a refractive index modulation region for the laser light beam in the optical waveguide layer, it is necessary to suppress the beam distortion of the laser beam caused in the refractive index modulation region formed in the optical waveguide layer when a voltage is applied to the optical waveguide layer through the electrodes, in order to output a beam having a favorable profile from the phase modulation element.

Further, in the above-described configuration of applying an ultraviolet light beam, a voltage is not applied to the wavelength conversion device. For this reason, this configuration may not be effective as a countermeasure against photorefraction caused upon application of a voltage. Moreover, as a configuration in which beam distortion can be suppressed even when a voltage is applied, the applicant has previously proposed a configuration of application of a pump light beam having a shorter wavelength than an optical beam (Japanese Patent Application No. 2011-199247). The pump light beam should desirably be applied as efficiently as possible.

SUMMARY

The present invention has an objective of providing an optical device, an optical deflection device, and an optical modulation which include a phase modulation element having: an optical waveguide layer which is formed of an electro-optic material and into which a laser light beam is inputted; and electrodes through which a voltage is applied to the optical waveguide layer to form a refractive index modulation region for the laser light beam in the optical waveguide layer, the optical device, the optical deflection device, and the optical modulation device being capable of suppressing the beam distortion of the laser beam caused in the refractive index modulation region formed in the optical waveguide layer when a voltage is applied to the optical waveguide layer through the electrodes and thus capable of outputting a beam having a favorable profile from the phase modulation element.

To achieve the above objective, one embodiment of the present invention provides an optical device comprising: a phase modulation element including an optical waveguide part and electrodes, the optical waveguide part being configured such that a laser light beam emitted by a laser light source is inputted to the optical waveguide part and having an optical waveguide layer formed of an electro-optic material, the electrodes being provided on respective sides of the optical waveguide part to apply a voltage to the optical waveguide layer, the phase modulation element being configured to modulate a phase of the laser light beam by using a refraction index modulation region formed in the optical waveguide layer when a voltage is applied to the optical waveguide layer through the electrodes; and a pump light source configured to irradiate at least the refraction index modulation region of the optical waveguide layer with a pump light beam for cancelling a space-charge electric field formed by drift carriers generated in the optical waveguide layer when a voltage is applied to the optical waveguide layer through the electrodes.

BRIEF DESCRIPTION OF THE DRAWINGS

FIGS. 9A and 9B are concept diagrams illustrating a trouble caused when a laser light beam is inputted to an optical waveguide layer formed of an electro-optic material.

FIG. 11 is a diagram showing an example of an optical spectrum of a pump light beam used in the optical device shown in FIG. 1.

DESCRIPTION OF THE PREFERRED EMBODIMENTS

Figure 1:
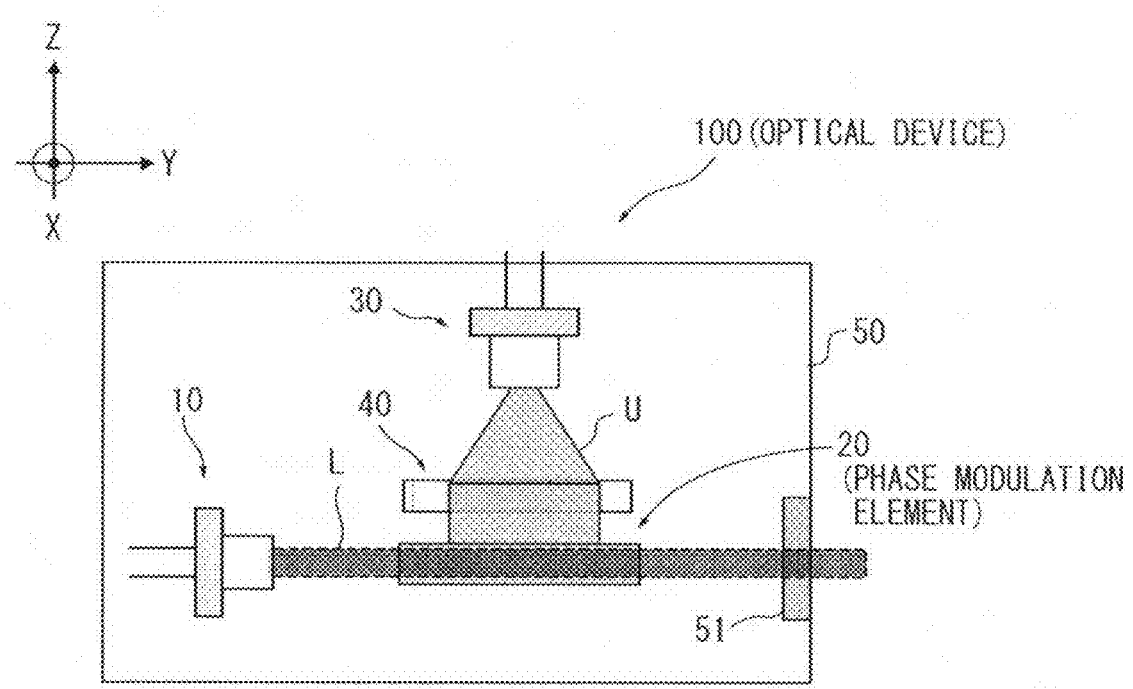
FIG. 1 is a schematic front view of an example of an optical device to which the present invention is applied.

FIG. 1 shows an example of a schematic configuration of an optical device to which the present invention is applied.

An optical device 100 includes: a light source 10 which is a laser light source configured to emit a laser light beam L; a phase modulation element 20 to which the laser light beam L emitted from the light source 10 is inputted; a light source 30 which is a pump light source configured to apply a pump light beam U to the phase modulation element 20; an optical element 40 provided between the light source 30 and the phase modulation element 20 to lead the pump light beam U emitted by the light source 30 to the phase modulation element 20; a casing 50 housing the light source 10, the phase modulation element 20, the light source 30, and the optical element 40 inside; and an output hole 51 provided to the casing 50 to output therethrough the laser light beam L, which is emitted from the light source 10 and then is transmitted through the phase modulation element 20, to the outside of the casing 50.

Figure 2:
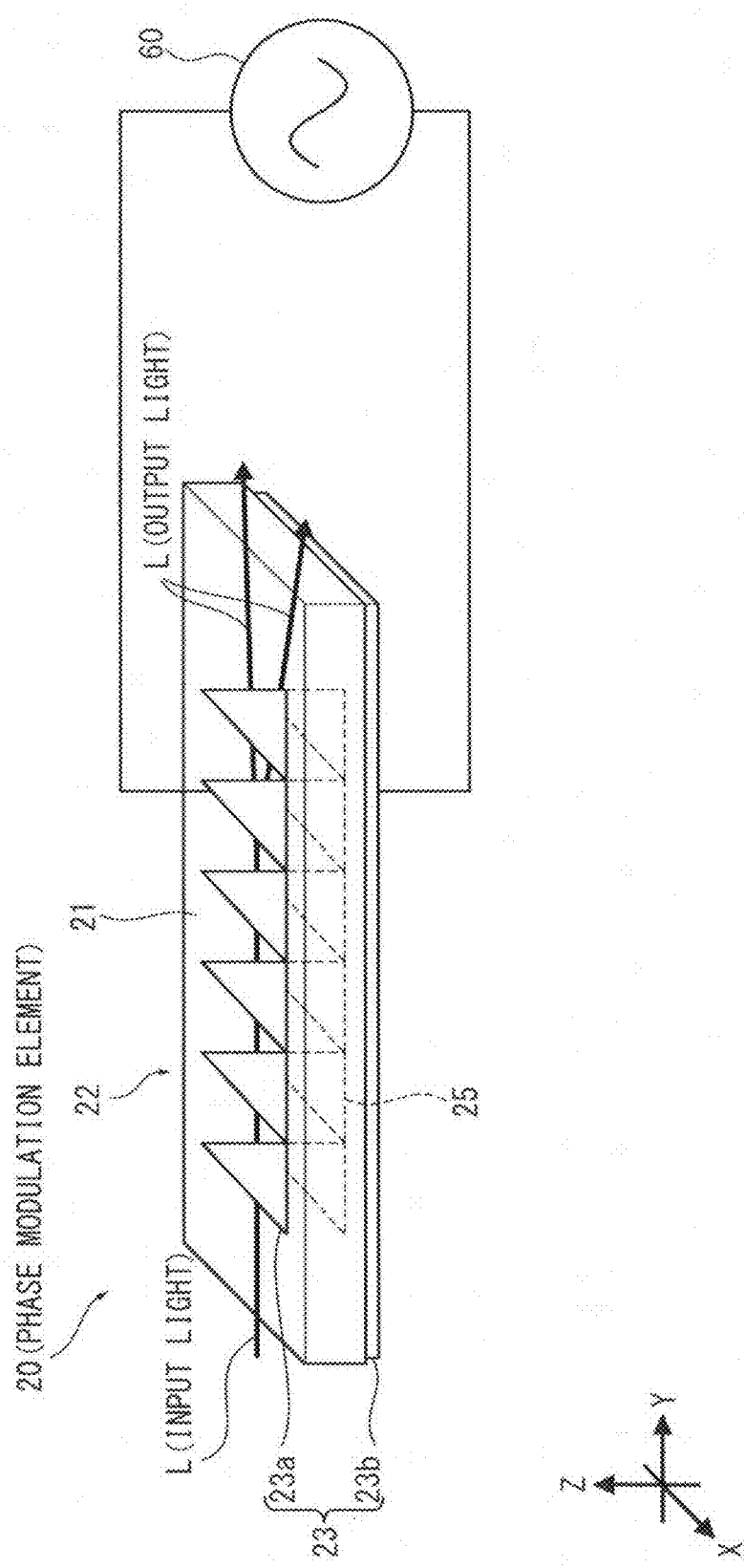
FIG. 2 is a schematic perspective view of a first configuration example of a phase modulation element mountable on the optical device shown in FIG. 1.

As shown in FIG. 2, the optical device 100 further includes a power supply 60 configured to apply a voltage to the phase modulation element 20.

In FIG. 1, arrow Y is a travel direction of the laser light beam L emitted from the light source 10, and indicates the travel direction of the laser light beam L in the phase modulation element 20 if the laser light beam L were not deflected in the phase modulation element 20. In FIG. 1, arrow X is a direction perpendicular to the paper surface of FIG. 1, and is perpendicular to the Y direction. In FIG. 1, arrow Z is a longitudinal direction on the surface of FIG. 1, and is a direction perpendicular to the X direction and the Y direction, i.e., perpendicular to the XY plane formed by the X direction and the Y direction.

Throughout the drawings, arrows X, Y, and Z indicate the X direction, the Y direction, and the Z direction as defined above using FIG. 1. Further, throughout the drawings, portions which are assigned reference numerals already used in previous drawings are the same as those in the previous drawings, and may not be described again. Further, the power supply 60 and other components are not shown in some drawings.

The light source 10 is formed of a laser diode, and is configured to propagate the laser light beam L with a wavelength of 650 nm in the Y direction. The laser light beam L deflects in the Z direction.

The phase modulation element 20 includes: an optical waveguide part 22 which is an optical waveguide structure having, as its core layer, an optical waveguide layer 21 through which the laser light beam L is transmitted; and electrodes 23 provided on respective Z-direction sides of the optical waveguide part 22 and connected to the power supply 60 so as to apply a voltage to the optical waveguide layer 21.

The optical waveguide layer 21 and the optical waveguide part 22 each have a planar shape parallel to the XY plane. The laser light beam L emitted from the light source 10 is inputted to the optical waveguide part 22 through which the laser light beam L then passes toward the output hole 51. The optical waveguide layer 21 is made of magnesium-doped lithium niobate (Z-cut manufactured by YAMAJU CERAMICS CO., LTD.) obtained by doping lithium niobate ($LiNbO_3$), which is an electro-optic material, with magnesium. Note that the material for the optical waveguide layer 21 is not limited to this. The electro-optic material may be lithium tantalate ($LiTaO_3$), and the dopant material may be iron.

Although lithium niobate and lithium tantalate are known to exhibit the photorefractive effect in which a light beam transmitted therethrough is distorted even with no voltage application, they are inexpensive, have high robustness, are stable, and are therefore useful. By doping them with magnesium or the like, the photorefractive effect is suppressed. Magnesium-doped lithium niobate (MgO-doped $LiNbO_3$) is known to have improved resistance to optical damage. The concentration of doped magnesium should be in a range of 4.5 mol % to 5.5 mol %, and especially, 5.0 mol % is most preferred.

Such an electro-optic material is ferroelectric, and exhibits a spontaneous polarization even with no application of an external field. A region having the same direction of spontaneous polarization is called a domain. The optical waveguide layer 21 is formed so that the directions of the spontaneous polarization are all in the same direction. A region between a certain domain and an adjacent domain having the spontaneous polarization direction different from the certain domain by 180° is called a domain wall.

In an example shown in FIG. 2, the optical waveguide part 22 is formed only by the optical waveguide layer 21, and the optical waveguide layer 21 is the optical waveguide part 22 itself. However, as will be described later using FIG. 4 etc., the optical waveguide part 22 may include clad layers 24 sandwiching the optical waveguide layer 21 in the Z direction. With the clad layers 24, the light use efficiency improves.

As shown in FIG. 2, the electrodes 23 form a pair sandwiching the optical waveguide part 22, and are connected to the power supply 60. The electrodes 23 include upper electrodes 23a and a lower electrode 23b integral with the top surface and the back surface of the optical waveguide part 22, respectively. The upper electrodes 23a are configured by multiple electrodes of a prismatic shape, or specifically an equilateral triangle, arranged in the Y direction. The lower electrode 23b has a flat quadrilateral, or specifically a rectangular shape so as to encompass the arrangement area of the upper electrodes 23a on the XY plane.

The power supply 60 is an AC power supply supplied with power by an external voltage supply, and is configured to apply a voltage signal of an AC voltage to the electrodes 23. When a voltage is applied to the electrodes 23, a primary electro-optic effect, i.e., the EO effect is exhibited inside the crystal of the optical waveguide layer 21 to change the refractive index inside the crystal. Thereby, refractive index modulation regions 25 are formed in the optical waveguide layer 21. The refractive index modulation regions 25 are each formed into a prismatic shape, or specifically, an equilateral triangle to correspond to the prism-shaped upper electrodes 23a, respectively. In this way, owing to the prismatic shape of each upper electrode 23a, pseudo-prisms are formed in the optical waveguide layer 21.

Accordingly, when an AC voltage is applied by the power supply 60 to the electrodes 23, the phase modulation element 20 uses the prism-shaped refractive index modulation regions 25 formed in the optical waveguide layer 21 to modulate the phase of the laser light beam L transmitted through the optical waveguide layer 21 and deflect and outputs the laser light beam L in the X direction, as shown by an arrow in FIG. 2.

This is because the phase modulation element 20 is capable of modulating the refraction index inside the crystal of the optical waveguide layer 21 using an electro-optic effect, and is configured to modulate the phase of the laser light beam L inside the crystal.

Although in FIG. 2, the arrow indicating the laser light beam L is shown as if the laser light beam L is transmitted through the upper electrodes 23a, the laser light beam L is actually transmitted through the optical waveguide layer 21. At this time, if a voltage is being applied by the power supply 60, the laser light beam L is transmitted through the refractive index modulation regions 25 having almost the same shapes as the upper electrodes 23a and formed in the optical waveguide part 22, or specifically, the optical waveguide layer 21. Then, the laser light beam L is refracted at the borders between the refractive index modulation regions 25 and is thus deflected in the X direction.

The angle at which the laser light beam L is deflected in the X direction by the phase modulation element 20 changes depending on the voltage applied to the electrodes 23 by the power supply 60. Accordingly, application of an AC voltage to the electrodes by the power supply 60 causes the laser light beam L outputted from the phase modulation element 20 to scan in the X direction at a cycle according to the cycle of the AC voltage of the power supply 60.

In this way, the optical device 100 including the phase modulation element 20 and the power supply 60 shown in FIG. 2 functions as an optical deflection device configured to use the phase modulation element 20 and the power supply 60 shown in FIG. 2 to deflect the laser light beam L inputted to the optical waveguide layer 21 in the X direction and output it as a deflected light beam. Since the optical waveguide layer 21 is made of magnesium-doped lithium niobate, the phase modulation element 20 serves as an optical deflection element which is a light beam deflection element usable in the visible light region. As described earlier, the material for the optical waveguide layer 21 is, of course, not limited to magnesium-doped lithium niobate. For example, even when the optical waveguide layer 21 is made of lithium tantalate ($LiTaO_3$) or lithium niobate doped with no magnesium, a similar optical deflection element can be formed.

Note that if the angle of deflection in the X direction may be fixed, the power supply 60 may be a DC power supply.

The above-described property in which the refractive index in the crystal of the optical waveguide layer 21 is modulated by the electro-optic effect to modulate the phase of the laser light beam L in the crystal can be similarly obtained when the refractive index modulation region 25 has not a prismatic shape but a quadrilateral shape, such as a rectangle. This property is also used when the optical device 100 employing the phase modulation element 20 is not an optical deflection device as in this embodiment, but is an optical modulation device to be described later, in which the phase modulation element 20 functions as an optical modulation element.

Figure 3:
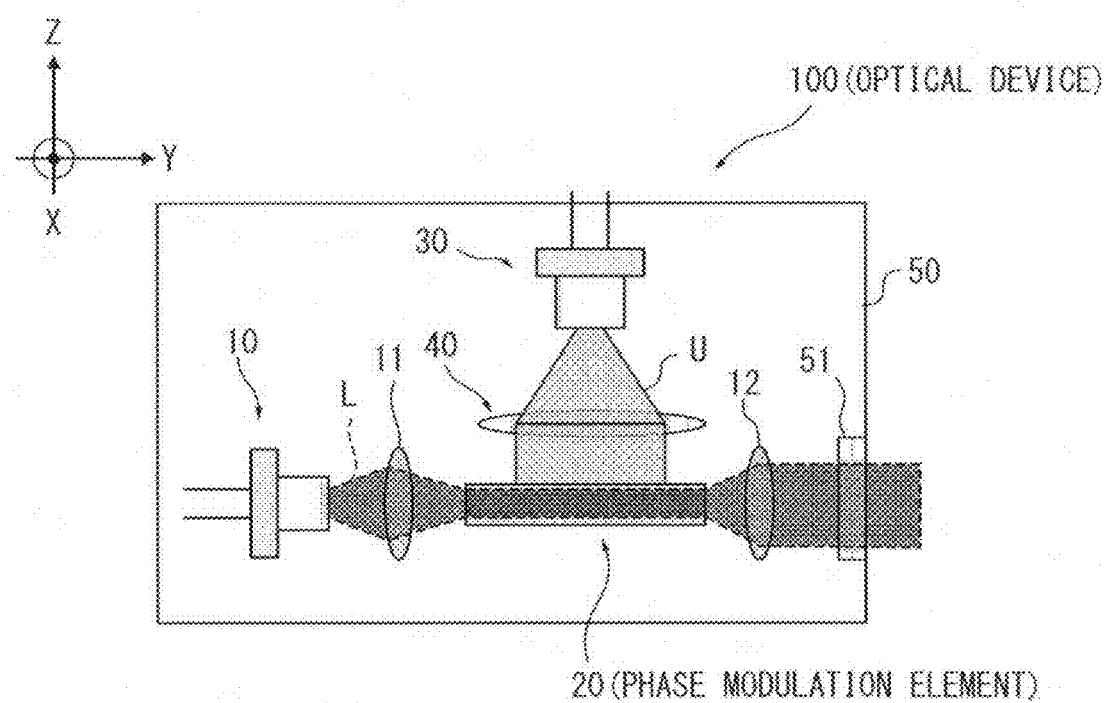
FIG. 3 is a schematic front view of an example of an optical deflection device for which the optical device shown in FIG. 1 is used.

When the optical device 100 is an optical deflection device, the optical device 100 should preferably include, as optical elements, a lens 11 between the light source 10 and the phase modulation element 20 and a lens 12 between the phase modulation element 20 and the output hole 51, as shown in FIG. 3, to improve the optical property as an optical deflection device.

The lens 11 has a focal length of 8 mm and is configured to input the laser light beam L emitted from the light source 10 to the optical waveguide layer 21. The lens 12 is configured to collimate a deflection light beam which is the laser light beam L outputted from the phase modulation element 20 and to output the collimated light beam to the outside of the optical device 100 through the output hole 51.

Figure 4:
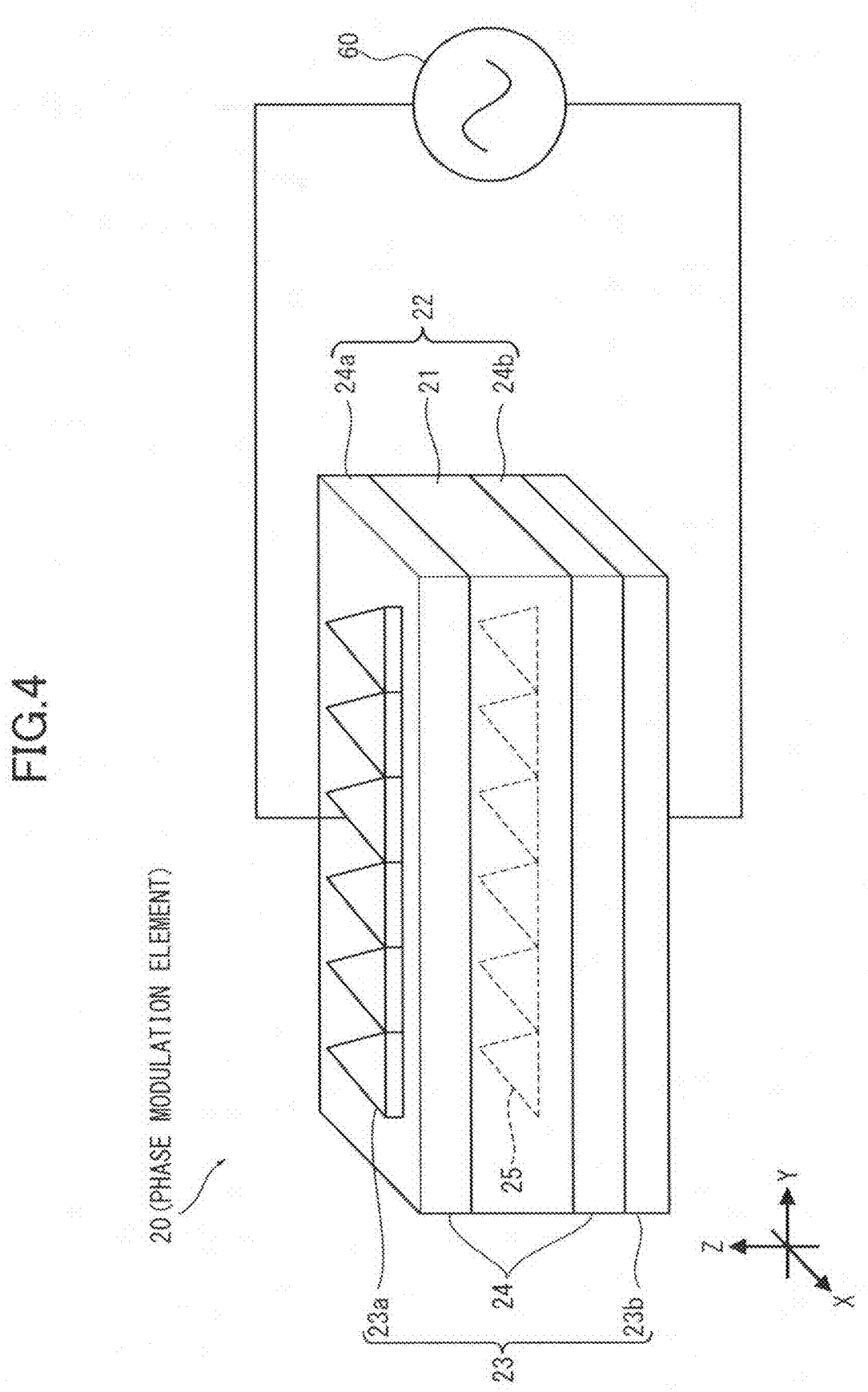
FIG. 4 is a schematic perspective view of a second configuration example of the phase modulation element mountable on the optical device shown in FIG. 1.

As shown in FIG. 4, to improve the light use efficiency of the laser light beam L, the clad layers 24 may be provided on the respective Z-direction sides of the optical waveguide layer 21 so that the optical waveguide part 22 includes the optical waveguide layer 21 and the clad layers 24. The clad layers 24 are provided to reduce optical loss in the guided light, and are made of a material having a low refractive index than the optical waveguide layer 21. The clad layers 24 are formed between the optical waveguide layer 21 and the respective electrodes 23.

Specifically, each clad layer 24 is made of $Ta_2O_5$ and is 1 μm thick herein. The material for the clad layer 24 is preferably selected from $SiO_2$, $Ta_2O_5$, $TIO_2$, $Si_3N_4$, $Al_2O_3$, and $HfO_2$; $Ta_2O_5$ and $SiO_2$ are especially preferable. The clad layers 24 include an upper clad 24a integral with the upper electrode 23a and a lower clad 24b integral with the lower electrode 23b.

Figure 5A:
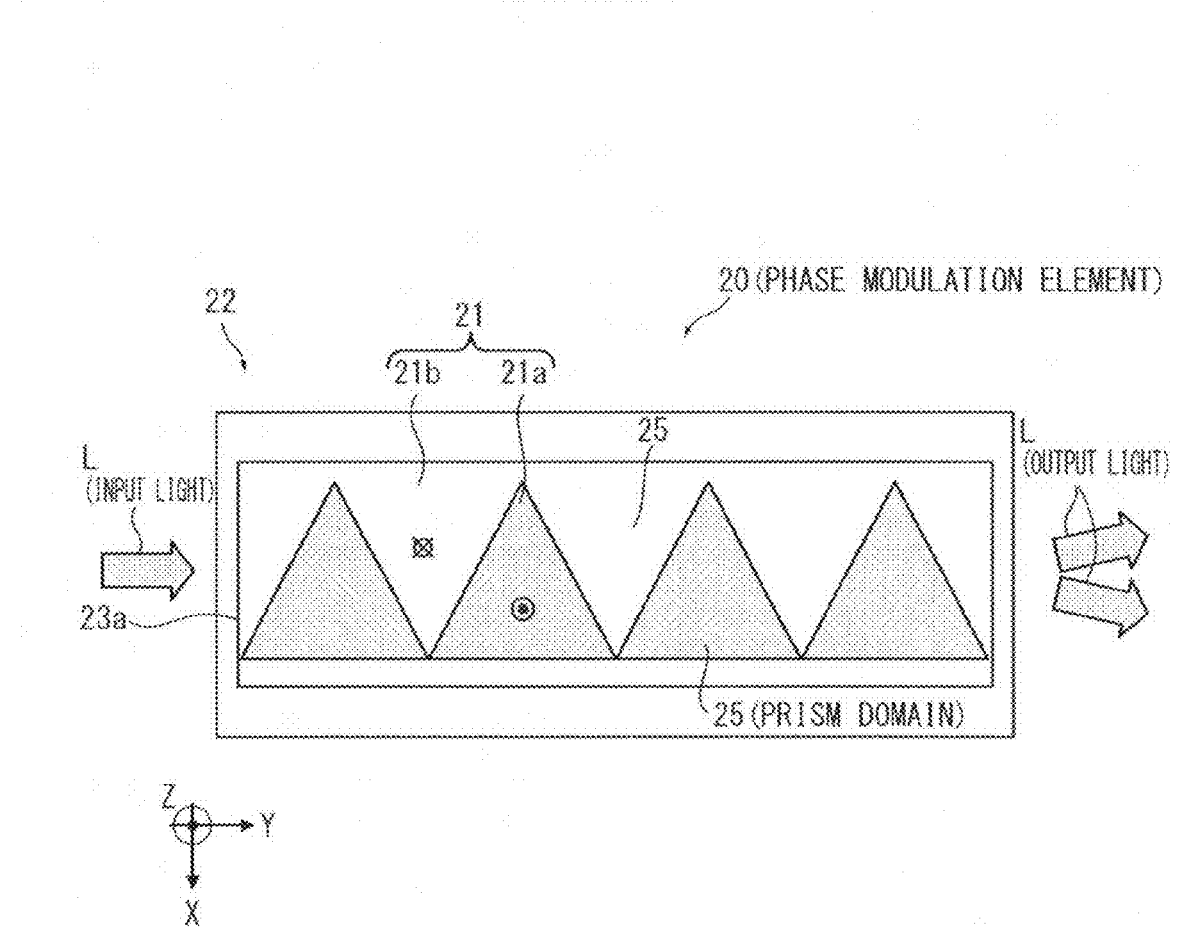
FIGS. 5A and 5B are schematic diagrams of a third configuration example of the phase modulation element mountable on the optical device shown in FIG. 1.
Figure 5B:
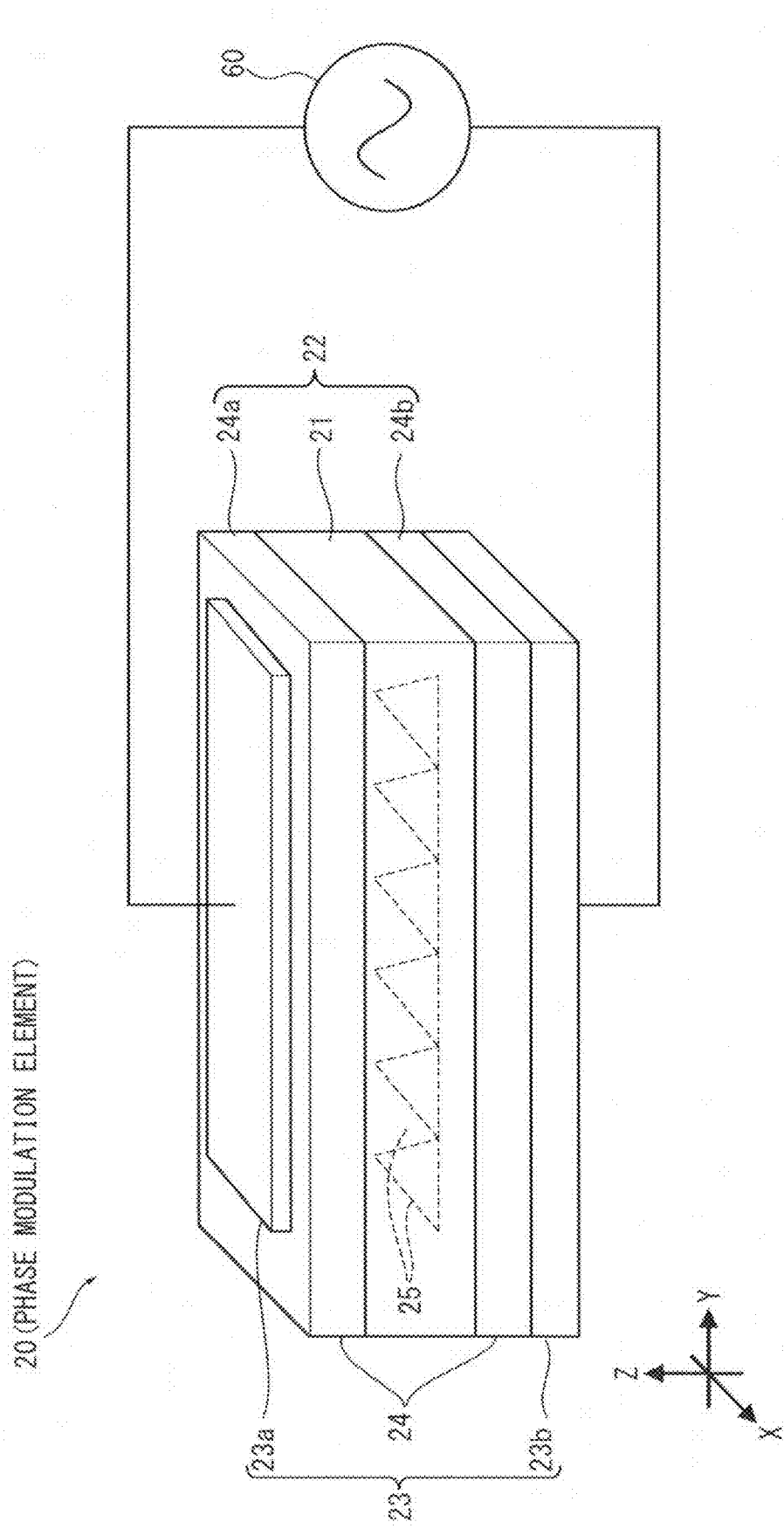

In the configuration examples shown in FIGS. 2 and 4, the refractive index modulation regions 25 are each formed into a prismatic shape according to the shapes of the electrodes 23. However, as shown in FIGS. 5A and 5B, both of the electrodes 23, namely the upper electrode 23a and the lower electrode 23b, may have a quadrilateral shape. In this case, as shown in FIG. 5A, polarization-inverted regions 21a of prismatic shapes, or specifically equilateral shapes, are formed in the optical waveguide layer 21 to form the refractive index modulation regions 25 into prismatic shapes, or specifically, equilateral triangles.

The polarization-inverted regions 21a are domains whose spontaneous polarization direction is inverted by 180°. A domain wall is formed between each polarization-inverted region 21a and an adjacent polarization-uninverted region 21b which is a domain whose spontaneous polarization direction is not inverted. In FIGS. 5A and 5B, the polarization axis of the polarization-inverted regions 21a is oriented in the −Z direction, and that of the polarization-uninverted regions 21b is oriented in the +Z direction. The upper electrode 23a and the lower electrode 23b are formed to cover the polarization-inverted regions 21a and the polarization-uninverted regions 21b.

When the electrodes 23 are formed into quadrilateral shapes and the refractive index modulation regions 25 are formed according to the polarization-inverted regions 21a, the refractive index modulation regions 25 are also formed by the polarization-uninverted region 21b. Thus, the refractive index modulation regions 25 formed by the polarization-inverted regions 21a and the refractive index modulation regions 25 formed by the polarization-uninverted regions 21b are formed inside the optical waveguide part 22, and the laser light beam L is refracted at each domain wall which is a border between adjacent ones of these refractive index modulation regions 25. Thus, the deflection angle obtained with this configuration is twice as large as that obtained with the configuration in which the refractive index modulation regions 25 are formed according to the shapes of the electrodes 23. The reason for this is described in detail below.

First, a detailed description is given of a specific operating principle of an optical deflection element which uses the EO effect.

As in the configuration described above, electrode layers for generating an electric field are arranged to face each other on the top surface and the back surface of an electro-optic material, respectively, and a voltage is applied to the optical deflection element through the electrode layers. Then, an electric field parallel to the polarization axis of the electro-optic material is formed, and the refractive index of the electro-optic material changes by the electro-optical effect. When the refractive index is to be changed using the Pockels effect, a change amount Δn of the refractive index of the electro-optic material is obtained by Formula (1).

[Formula 1]

$$\Delta n = -\frac{1}{2}n^3 r_{ij}\frac{V}{d} \quad (1)$$

In Formula (1), n indicates the refractive index of the electro-optic material, $r_{ij}$ indicates the electro-optic constant, v indicates a voltage applied, and d indicates the crystal thickness.

Next, a description is given of a deflection angle obtained when the refractive index modulation regions 25 are formed according to the shapes of the electrodes 23.

When multiple prism electrodes are formed with multiple triangular electrodes formed above a region where a light beam propagates, the deflection angle of outputted light beam is the total of the angles of deflection by the respective polarization-inverted regions, and therefore the deflection angle is increased. This is because, when a voltage is applied to the electrodes, triangular refractive-index change regions are formed, and each functions as a prism with respect to the propagated beam. In other words, as the light beam propagates through the refractive-index change regions, the propagating light beam is given, at each region, a deflection angle in the X direction. A deflection angle θ given to the laser beam outputted from the optical beam deflection element is proportional to the amount of the refractive index change of the electro-optic material, and is expressed by the following formula.

[Formula 2]

$$\theta = \Delta n \frac{L}{D} \quad (2)$$

In Formula (2), L indicates the total length of the multiple prisms, and D indicates the width of each prism. As can be found by Formulae (1) and (2), the deflection angle of the laser beam outputted from the optical deflection element is proportional to the voltage applied. Therefore, the laser beam of a desired deflection angle can be outputted by controlling the voltage to be applied to the optical deflection element.

In the following, a description is given of a deflection angle formed when the refractive index modulation regions 25 are formed according to the shapes of the polarization-inverted regions 21a.

Generally, it is possible to control the polarization axis of an electro-optic material forming the optical waveguide layer being a core layer. Accordingly, as shown in FIG. 5A, prism domains can be formed inside the core layer. When the core layer has inside the polarization-inverted regions formed by arranging multiple prism shapes, prism-shaped refractive-index change regions are formed in the electro-optic material by application of a voltage to the element through the electrode layers entirely covering the polarization-inverted prism regions.

Since the sign of the refractive index change is different between the polarization-inverted region and other region, the above configuration offers the same effect as the configuration actually having multiple prisms inside an electro-optic material. The propagation direction of a light beam inputted from an end surface of the deflection element is tilted in the X-axis direction by the prism part, and a deflected beam is outputted from an output end of the element. When the sign of the refractive index change is inverted by polarization inversion, the amount of refractive index change becomes twice that of the configuration having prism-shaped electrodes. Thus, the deflection angle θ of a beam outputted from the element is obtained as follows.

[Formula 3]

$$\theta = 2 \cdot \Delta n \frac{L}{D} \quad (3)$$

As already described, the electrodes 23 are rectangular so as to cover the prism domains. When the refractive index modulation regions 25 are formed into prismatic shapes by the shapes of the polarization-inverted regions 21a, the electrodes 23 can be formed as a quadrilateral shape and thus can be formed easily.

A description is given of a method of polarization inversion, i.e., a method of forming polarization-inverted regions. In the polarization inversion process, a photoresist film with a 2 μm thickness is formed on an electro-optical substrate (a φ3" z plate (t=300 μm) manufactured by YAMAJU CERAMICS CO., LTD.) by spin coating. A resist pattern of equilateral triangles is formed on the +Z surface of the substrate by photolithography. In this resist pattern, two sides of each equilateral triangle into which and from which light inputs and outputs are parallel to the respective domain walls. Then, using a direct electric-field application method, a voltage corresponding to a coercive electric field is applied to the polarization-inversion substrate to form equilateral triangular polarization-inverted regions.

The characteristic point is that the input surface and the output surface of each prism-shaped polarization-inverted region are parallel to the respective domain walls. In order for a light beam to be refracted in the polarization-inverted region, the light input and output surfaces of the polarization-inverted region must not be perpendicular to a travel direction of the light. Accordingly, each polarization-inverted region 21a should preferably have a prismatic shape or a fan shape. A prismatic shape indicates a polygon such as a triangle and a trapezoid, and a fan shape indicates a shape formed by multiple straight lines and an arc. Considering accurate formation of the boarder surfaces of each polarization-inverted region and also size reduction of the element, the most preferred shape of the polarization-inverted region 21a is an equilateral triangle, as in this embodiment.

In an experiment using the direct electric-field application, the polarization-inverted regions expanded beyond the resist borders by about 30 μm. For this reason, the resist pattern should desirably be formed so that each pattern of equilateral triangle is smaller than the desired prism domain by 30 μm. In addition, to accurately form the prism domains, preferably, a spike electric field is first applied to uniformly generate inverted nuclei, and a constant electric field is next applied to expand the domain walls of the inverted nuclei. Specifically, by applying a spike electric field of 9 kV/mm for 5 ms and a constant electric field of 5.5 kV/mm for 5 sec, prism domains each having straight sides at the borders between the prism domains and a sharp vertex angle can be formed.

Figure 6:
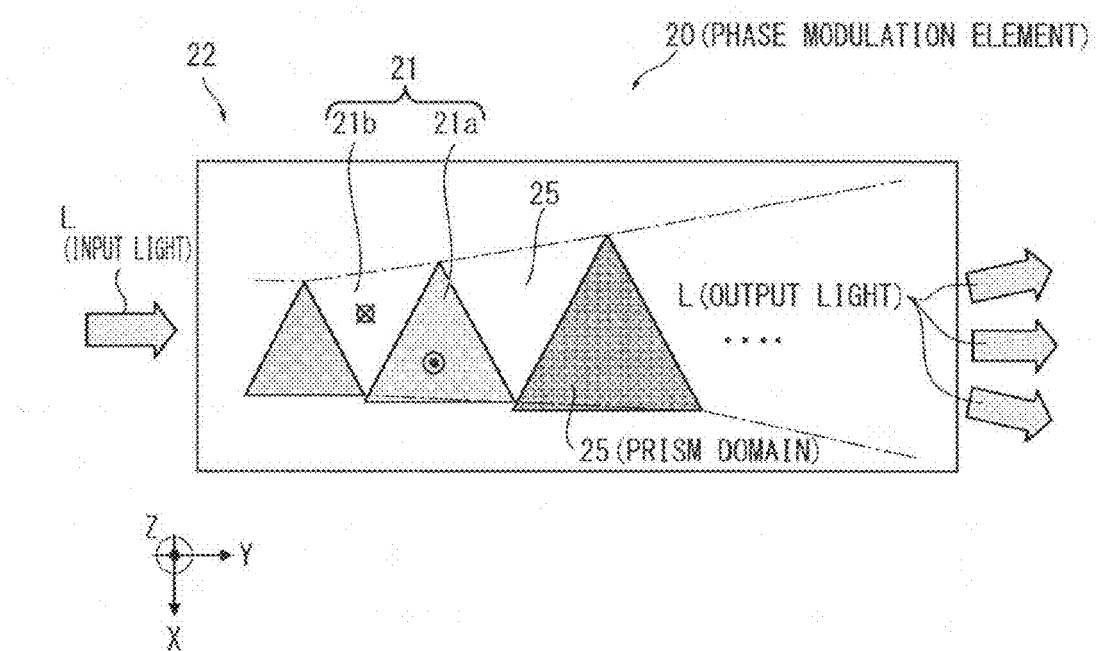
FIG. 6 is a schematic plan view of a fourth configuration example of the phase modulation element mountable on the optical device shown in FIG. 1.

When the multiple prism-shaped refractive index modulation regions 25 are formed in the Y direction as shown in FIGS. 2, 4, 5A, and 5B, the areas of the refractive index modulation regions 25 may progressively increase downstream in the Y direction, as shown in FIG. 6. It is preferable that the refractive index modulation regions 25 have similar shapes to each other. In the configuration shown in FIG. 6, the refractive index modulation regions 25 are formed into prismatic shapes by the shapes of the polarization-inverted regions 21a, and the electrodes 23 are quadrilateral, as in the example in FIGS. 5A and 5B. However, the refractive index modulation regions 25 may be formed into prismatic shapes by the shape of the electrodes 23, as in the examples shown in FIGS. 2 and 4.

The deflection angle can be further increased when a horn shape is formed by progressively increasing the size of the prisms to progressively increase the sizes of the polarization-inverted regions 21a from the input side of the laser light beam L as shown in FIG. 6.

According to a non-patent document (Yi Chiu, et al, Journal of Lightwave Technology, VOL 17, No. 1 January 1999), a prism width D(z) can be obtained from the formula below, using a travel distance z, an input-side prism width $D_0$, a maximum refractive index change amount $\Delta n_{max}$, and a refractive index $n_0$.

[Formula 4]

$$\frac{dD(z)}{dz} = \left[\frac{4\Delta n_{max}}{n_0}\ln\left(\frac{D(z)}{D_0}\right)\right]^{1/2} \quad (4)$$

Further, an external deflection angle θ(z) is obtained as follows.

[Formula 5]

$$\theta(z) = 2\Delta n\left[\frac{n_0}{\Delta n_{max}}\ln\left(\frac{D(z)}{D_0}\right)\right]^{1/2} \quad (5)$$

In the configuration shown in FIG. 6, $D_0$=0.5 mm, $\Delta n_{max}$=3.83×10$^{-3}$, refractive index n=2.203, and prism length L=20 mm, and formulae (4) and (5) are used to obtain the prism width D(z) through sequential computation. The output-side prism width is found to be 1.56 mm.

The prism width obtained using Formulae (4) and (5) is expressed by a distance between two envelopes shown in FIG. 6. These envelopes form horn-shaped prism envelopes. In a preferable method of forming polarization-inverted regions of a horn-shape, the sizes of the equilateral triangular polarization-inverted regions 21a are determined according to these envelopes sequentially from the input side with no space between them as shown in FIG. 6.

Figure 7:
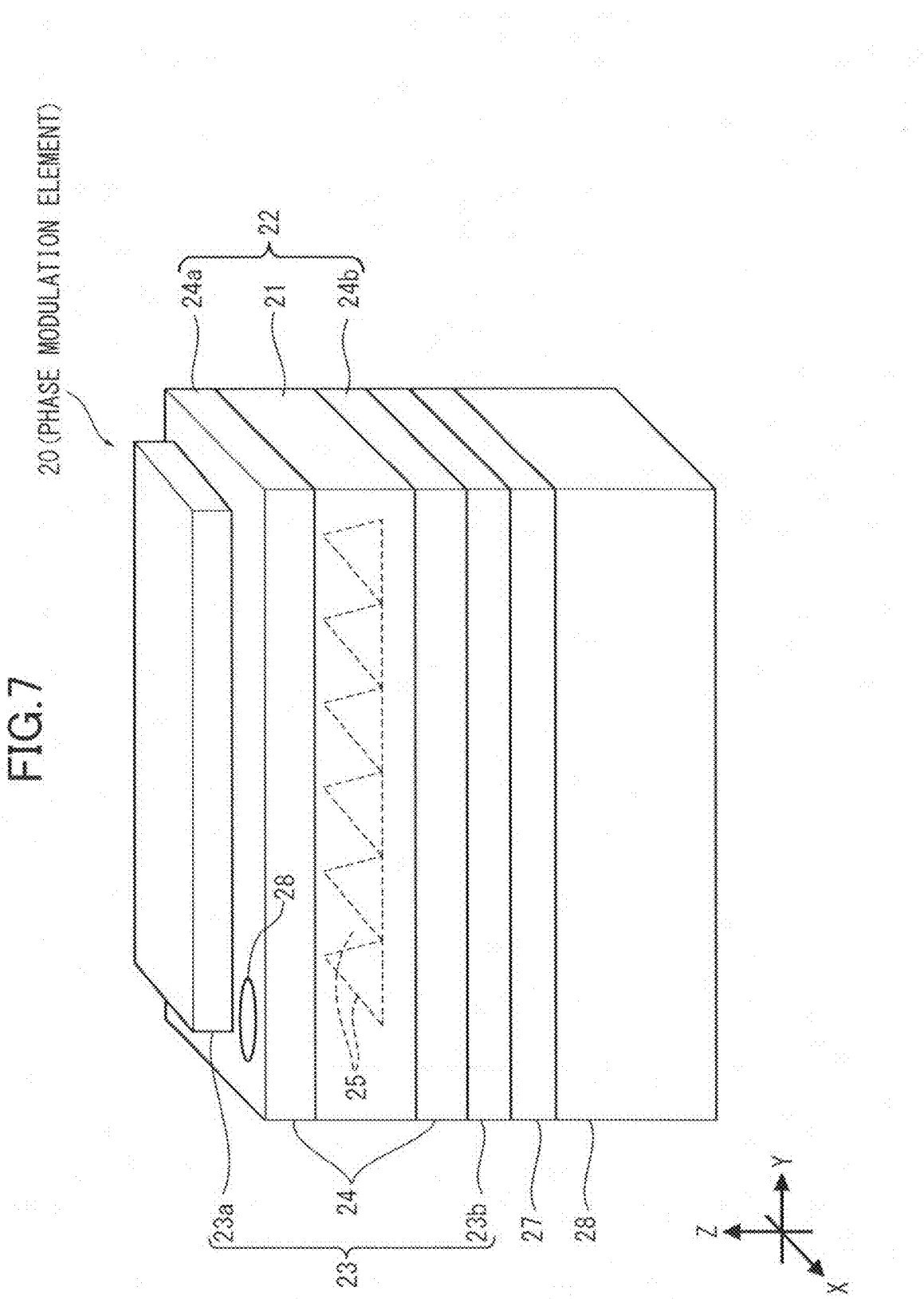
FIG. 7 is a schematic plan view of a fifth configuration example of the phase modulation element mountable on the optical device shown in FIG. 1.

As shown in FIG. 7, the phase modulation element 20 may integrally include a support board 26. By the support board 26 integrally formed, the optical waveguide layer 21 which is a core layer and, consequently, the optical waveguide part 22 can be reduced in thickness. When the optical waveguide layer 21 is thin, the device can be driven with a low voltage. In the example shown in FIG. 7, the thickness of the optical waveguide layer 21 is reduced to 10 μm by thin-film polishing. The support board 26 constitutes the phase modulation element 20 at a position opposite from the light source 30, or more specifically, opposite from the side irradiated with the pump light beam U.

The phase modulation element 20 shown in FIG. 7 includes, besides the support board 26, an adhesion layer 27 between the support board 26 and the lower electrode 23b, and also includes an extraction electrode 28 for the lower electrode 23b, provided in the upper clad 24a. In the configuration shown in FIG. 7, the electrodes 23 are quadrilateral as in the example shown in FIGS. 5A and 5B, and the refractive index modulation regions 25 are formed into prismatic shapes by the shapes of the polarization-inverted regions 21a as in the examples shown in FIGS. 5A to 6. Instead, the refractive index modulation regions 25 may be formed into prismatic shapes by the shapes of the electrodes 23, as in the examples shown in FIGS. 2 and 4.

The phase modulation element 20 shown in FIG. 7 is manufactured as follows.

[Lower Clad and Lower Electrode]

The lower clad 24b is formed on one side of a base material to be the optical waveguide layer 21. The lower clad 24b is formed by forming a 1-μm-thick film of $Ta_2O_5$ by sputtering. Then, following the film formation of the lower clad 24b, the lower electrode 23b is formed with a 200-nm-thick film of Ti.

[Bonding of Support Board and Reducing Film Thickness of Optical Waveguide Layer]

After the formation of the lower electrode 23b, the lower electrode 23b and the support board 26 are bonded to each other using an adhesive to form the adhesion layer 27. The adhesion layer 27 formed into an even thickness with a surface accuracy of 1 μm or lower. Then, the base material of the optical waveguide layer 21 is polished to reduce the thickness thereof.

Preferably, the support board 26 has the same thermal expansion coefficient as the material used for the optical waveguide layer 21. When a material having a different thermal expansion coefficient is used, a crack may occur. This is because when thermal expansion takes place after the bonding, the optical waveguide layer 21 or its base material may be deformed due to an internal stress.

In the above bonding, a UV-curable resin adhesive is used as the adhesive, and a lithium niobate substrate of a 300-μm thickness is used as the support board 26. After the bonding, the base material for the optical waveguide layer 21 is polished to reduce the thickness from 300 μm to 10 μm to thereby form the optical waveguide layer 21.

The thermal expansion coefficient, in the X direction, of lithium niobate used for the support board 26 is $1.54 \times 10^{-5}$/K, and that of SUS303 is $1.46 \times 10^{-5}$/K. Having an almost equal thermal expansion coefficient as the material for the optical waveguide layer 21, SUS303 can be used for the support board 26.

Besides the bonding using an adhesive, another way of integrally forming the support board 26 is to use a metal material for the support board 26 and directly attach the lower electrode 23b and the support board 26 to each other.

[Upper Clad and Upper Electrode]

After the optical waveguide layer 21 is formed by polishing, the upper clad 24a and the upper electrode 23a are formed. They are formed in the same way as the lower clad 24b and the lower electrode 23b. The upper clad 24a is formed by forming a 1-μm-thick film of $Ta_2O_5$ by sputtering. Then, following the film formation of the upper clad 24a, the upper electrode 23a is formed with a 200-nm-thick film of Ti.

Desirably, the upper electrode 23a has as small an area as possible, the area being enough for the phase modulation element 20 to function as an optical deflector. The reason for this as follows. In an optical deflector using an electro-optic element, the capacitance and the operating frequency have a trade-off relation therebetween. Accordingly, with a small capacitance, the optical deflector can be operated with a high frequency using a low power. For this reason, the upper electrode 23a is preferably formed only above a region where the refractive index changes, i.e., where light is transmitted while being deflected. This is why the upper electrode 23a is formed not on the entire area of the upper clad 24a, but only on the above-described region.

[Extraction Electrode for Lower Electrode]

The extraction electrode 28 is formed to gain continuity with the lower electrode 23b. The extraction electrode 28 is formed by embedding a conductive material into an extraction electrode formation portion generated in the upper clad 24a, the optical waveguide layer 21, and the lower clad 24b at a position outside an area where the upper electrode 23a is formed. This extraction electrode 28 allows extraction of the lower electrode 23b without making the area of the support board 26 larger than that of the optical waveguide layer 21. Thus, the phase modulation element 20 being a waveguide-type electro-optic element can be reduced in size.

The extraction electrode formation portion is generated by forming a 30-μm-deep V groove using a dicing saw. Then, a film of Ti was formed in this V groove to form the extraction electrode 28. Note that dry etching, excimer ablation, and the like are also suitable for forming the extraction electrode.

Figure 8:
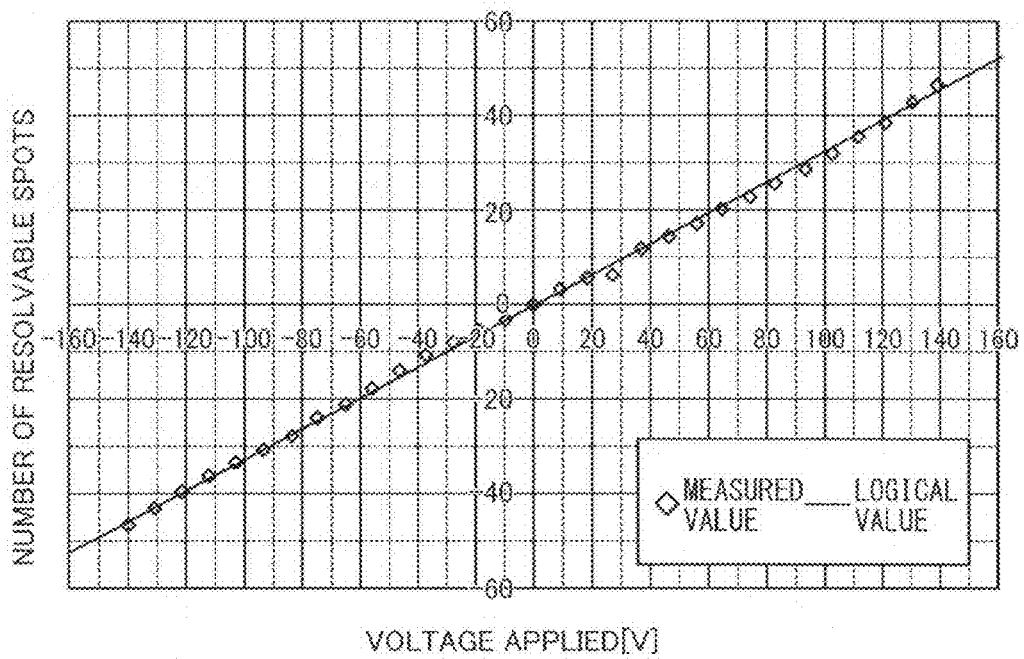
FIG. 8 shows results of performance evaluation of an optical device having the phase modulation element shown in FIG. 7.

FIG. 8 shows results of performance evaluation of an optical deflector having the phase modulation element 20 shown in FIG. 7. In FIG. 8, the horizontal axis indicates a voltage applied to the optical deflector, and the vertical axis indicates the number of resolvable spots obtained. An optical deflector having a favorable profile of 100 resolvable spots with respect to an operating voltage of 300 Vpp was obtained. Note that this result was obtained with the light source 30 being driven.

The light source 30 is provided to suppress or prevent optical damage, i.e., photorefraction occurring when the laser light beam L is transmitted through the optical waveguide layer 21 formed of an electro-optic material. More particularly, the light source 30 is provided to suppress or prevent photorefraction occurring when the laser light beam L is transmitted through the optical waveguide layer 21 while a voltage is applied to the optical waveguide layer 21 through the electrodes 23.

In the phase modulation element 20, if the light source 30 were not driven, photorefraction would occur due to a space-charge electric field formed by drift carriers generated in the optical waveguide layer 21 when a voltage is applied to the optical waveguide layer 21 through the electrodes 23.

Accordingly, to prevent the formation of the above space-charge electric field, the light source 30 applies the pump light beam U, in the Z direction, to at least the refractive index modulation regions 25 of the optical waveguide layer 21. For the prevention of the space-charge electric field, the pump light beam U is ultraviolet light beam which has, preferably, a wavelength of 350 nm to 400 nm, but may have a wavelength of 400 nm to 500 nm. In this regard, the light source 30 is a light source of visible light with a short-length wavelength. The reason why photorefraction is suppressed or prevented by light with the above wavelength will be described later together with a description of why photorefraction occurs.

The pump light beam U is applied to the optical waveguide layer 21 by being transmitted through the electrode 23, or specifically, the upper electrode 23a. Thereby, the pump light beam U can be efficiently applied to the entire surface of the refractive index modulation regions 25.

The optical element 40 is provided to efficiently lead the pump light beam U emitted by the light source 30 to the phase modulation element 20, or specifically, the refractive index modulation regions 25 of the optical waveguide layer 21. Accordingly, the optical element 40 is preferably an optical lens or an optical member, such as a flat-plate diffraction optical element, configured to control the irradiation angle of light.

The pump light beam U reaches the optical waveguide layer 21 after being transmitted through the upper electrode 23a. Accordingly, if the pump light beam U is shielded by the upper electrode 23a, the irradiation efficiency of the bump light U decreases. For this reason, the material for the upper electrode 23a should preferably be not a metal material such as Au, Pt, Ti, Al, Ni, or Cr, but a material transparent with respect to the pump light beam U, such as ITO or ZnO. In this regard, although the upper electrode 23a is formed of Ti in the example shown in FIG. 7, the upper electrode 23a should preferably be a transparent electrode formed of ITO, ZnO, or the like transparent to the pump light beam U, not only in the example shown in FIG. 7, but also in all the examples described above.

When the clad layers 24 are provided, the upper clad 24a should preferably be transparent to the pump light beam U, for the same reason as above. In the phase modulation element 20, the support board 26 is located opposite the side irradiated with the pump light beam U, and therefore does not need to be transparent to the pump light beam U. The material and thickness of the support board 26 can therefore be selected with a high degree of freedom. However, if the support board 26 is provided on the side irradiated with the pump light beam U, the support board 26 should preferably be transparent to the pump light beam U, for the same reason as above. If the pump light beam U is applied from the support board 26 side, the lower electrode 23b is configured with a transparent electrode, and if the lower clad 24b is provided, the lower clad 24b is configured with a member transparent to the pump light beam U.

A description is given of why photorefraction occurs.

In the phase modulation element 20, if the pump light beam U were not applied, photorefraction would appear as a phenomenon in which the beam profile is distorted in the optical waveguide layer 21 by a voltage applied through the electrodes 23, i.e., photorefraction would appear as beam distortion.

The beam distortion can also be suppressed through irradiation of a pump light beam in the X direction in FIG. 7, without using the transparent electrode or the transparent board. However, as already described, the beam distortion can be suppressed more when the pump light beam is applied to the optical waveguide layer 21 through the electrode.

The mechanism of the beam distortion is described with reference to FIGS. 9A and 9B.

Figure 9A:
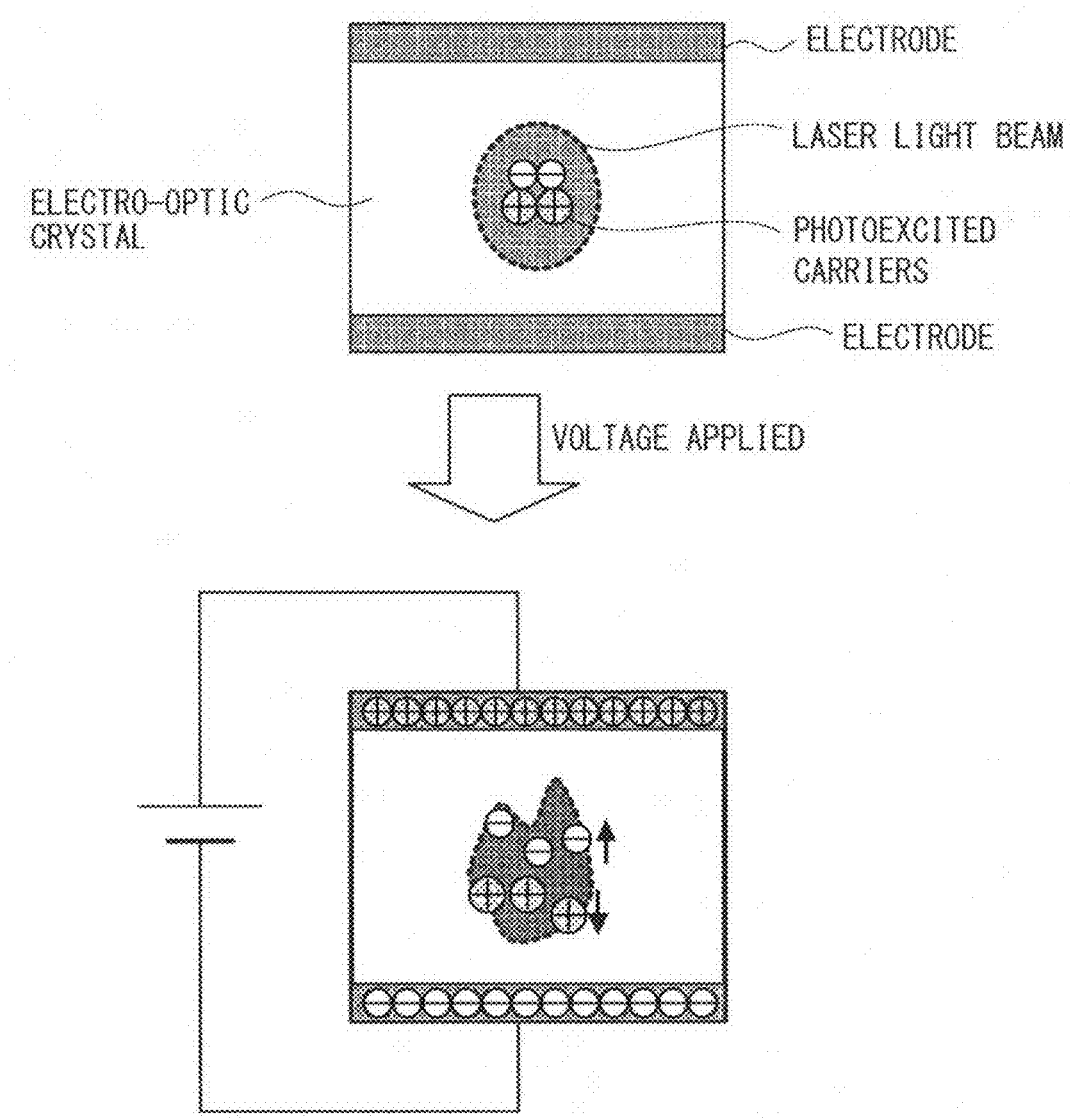

FIGS. 9A and 9B are diagrams illustrating the physical mechanism of the beam distortion.

As shown in FIG. 9A, when a visible light beam or a laser light beam is inputted to an electro-optic crystal which is typically lithium niobate, photoexcited carriers are generated in the crystal at a portion irradiated with the light beam. This is because, by photoexcitation, carriers transition from an impurity level formed in an energy band inside the crystal due to lattice defect or impurities such as Fe or Cr, as shown in FIG. 9B.

Further, as shown in FIG. 9A, when a voltage is applied to the electro-optic crystal, the carriers generated are caused to drift inside the electro-optic crystal by an external electric field. As shown in FIG. 9B, when such drift occurs, the drifting carriers are captured at a trap level formed inside the crystal. As a result, the impurity level which contributed to the photoexcitation now acts as an ionized donor and forms a local space-charge electric field with carrier electrons.

The electro-optic effect caused by this local space-charge electric field is thought to be giving uneven distribution to the refractive index inside the refractive index modulation regions to which the voltage is applied. This uneven distribution of the refractive index is a factor for causing the beam distortion.

Generally, lithium niobate and lithium tantalate are known to produce the photorefractive effect where a beam is distorted when a light beam is transmitted therethrough even with no application of voltage. As a countermeasure for this, lithium niobate and lithium tantalate are doped with magnesium to prevent the photorefractive effect.

However, in an optical deflector or an optical modulator where a voltage is applied to an electro-optic crystal to induce modulation of the refractive index, beam distortion was confirmed even when lithium niobate or lithium tantalate doped with magnesium was used.

This is because the external electric field generated by the application of voltage largely promotes drifting of the photoexcited carriers to consequently make redundant the formation of the space-charge electric field by the carriers. Accordingly, the voltage-applied region, namely, the refractive-index modulation region causes the beam distortion much more than the refractive-index non-modulation region does.

When the pump light beam U is applied to at least the refractive index modulation regions 25 by the light source 30, the drift carriers captured at the trap level formed inside the electro-optic crystal configuring the optical waveguide layer 21 are excited again to immediately transition to the conduction band. This suppresses or prevents the uneven electric field distribution formed by the photoexcited carriers captured at the trap level inside the phase modulation element 20, and suppresses or prevents formation of the space-charge electric field. Consequently, the beam distortion is suppressed or prevented.

The wavelength of the pump light beam U suitable for obtaining such an effect is in the range of 350 nm to 500 nm, and more preferably, 350 nm to 400 nm. The band gap of lithium niobate is about 330 nm. Application of a light beam with a wavelength not higher than 330 nm promotes not only excitation from the trap level, but also excitation of a valence band. When the excitation is promoted, lithium niobate acts in a similar manner to a conductor to generate no electric field in the phase modulation element, and a short circuit occurs. For this reason, to efficiently cause only the excitation from the trap level, the wavelength of the excitation light beam is preferably in the range of 350 nm to 400 nm.

Moreover, the pump light beam U should preferably be applied not by a coherent light source, but by an incoherent light source. This is because, if a coherent light beam is applied to the phase modulation element 20 as the pump light beam U, irradiation distribution of the pump light beam U occurs due to diffraction and interference inside the crystal, and as a result, uneven distribution of the refractive index is easily formed inside the crystal.

Taking the above conditions into consideration, an experiment was carried out to confirm the effect of irradiation of the pump light beam U on beam distortion. FIGS. 10A to 10E show the results of the experiment.

FIGS. 10A to 10E each show the profile distribution of the laser light beam L outputted from the output hole 51 of the optical device 100.

The conditions for the experiment were as follows. The laser light beam L was $\lambda 650$ nm. The optical power was 10 mW, the beam diameter was 1 mm ($1/e^2$), and the polarization direction was the Z direction. The phase modulation element 20 was produced by forming the optical waveguide layer 21 using magnesium-doped lithium niobate (Z-cut manufacture by YAMAJU CERAMICS CO., LTD.) and forming a film of ITO on the upper and lower surfaces of the optical waveguide layer 21 as the electrodes 23 by vapor deposition. The size of the phase modulation element 20 was (X, Y, Z)=(10 mm, 24 mm, 0.3 mm), and the size of the ITO electrode was (X, Y, Z)=(5 mm, 20 mm, 0.0002 mm).

Figure 10A:
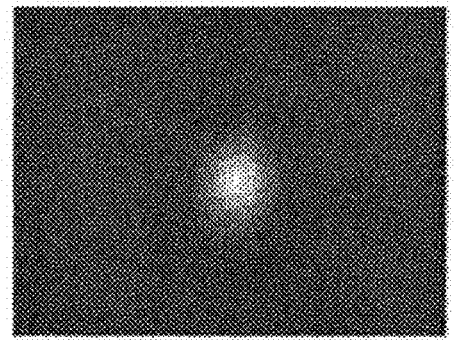
FIGS. 10A to 10E are diagrams showing results, obtained under various conditions, of profiles of laser light beams inputted to the optical waveguide layer formed of an electro-optic material.

FIG. 10A shows a profile result obtained when the laser light beam L was caused to be transmitted through the phase modulation element 20 using the lens 11, with no application of voltage to the phase modulation element 20 and with no irradiation of a visible light beam from the light source 30. It can be seen from FIG. 10A that a favorable profile result was obtained.

Figure 10D:
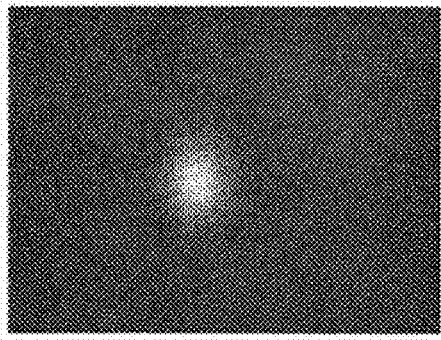
Figure 10B:
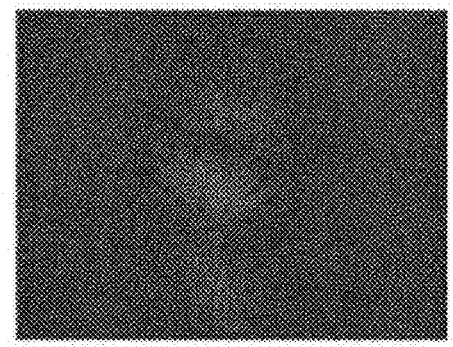

On the other hand, FIG. 10B shows a profile result obtained under the same conditions as those in FIG. 10A except that a voltage was applied to the phase modulation element 20. The voltage was a DC voltage of 300 V, and was applied in the Z direction. The value of the electric field applied to the optical waveguide layer 21 was 1 kV/mm. It can be seen from a comparison to FIG. 10A that the beam was distorted.

Figure 10E:
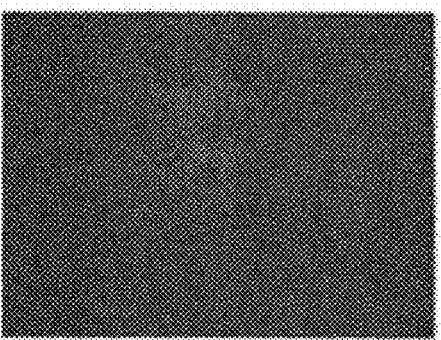
Figure 10C:
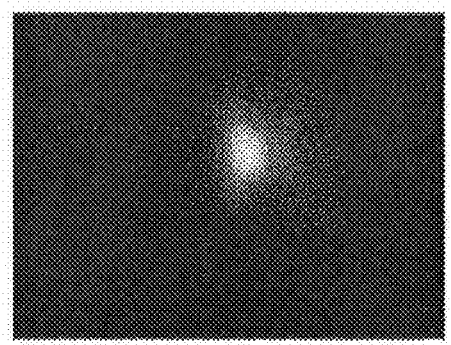

FIG. 10C shows a profile result obtained under the same conditions as those in FIG. 10B except that the pump light beam U was applied. The light source 30 was a UV-LED (Nichia CORPORATION: HC4U133a). The wavelength of the pump light beam U was 380 nm, and the light output power was 0.1 W. The UV-LED was placed at a position 20 mm away from the phase modulation element 20 in the Z direction to apply the pump light beam U to the phase modulation element 20. It can be seen from a comparison to FIG. 10B that the beam distortion was suppressed.

Further, FIG. 10D shows a profile result obtained under the same conditions as those in FIG. 10C, except that an optical lens (Thorlabs: UV fused silica) was placed, as the optical element 40, between the phase modulation element 20 and the UV-LED at a position 10 mm away from the phase modulation element 20. By using the optical lens, the UV irradiation power was evenly and efficiently applied. Thus, it can be seen that the profile result of FIG. 10D is better than that of FIG. 10C. Moreover, FIG. 10E shows a profile result in which a UV light beam was applied to the refractive index non-modulation region near the output end, with the position of the UV-LED being shifted in the Y direction by 10 mm. As in FIG. 10B, the result shows a disturbed profile. What can be said from this result is that the UV light beam needs to be applied to the refractive index modulation region.

For the reasons above, in the optical device 100, an UV-LED having an optical spectrum shown in FIG. 11 is used as the light source 30. As shown in FIG. 11, the light source 30 outputs the pump light beam U with a central wavelength of 380 nm. Further, a lens with a focal length of 20 mm is used as the optical element 40 so that an ultraviolet light beam is efficiently applied to the refractive index modulation regions 25.

Figure 12A:
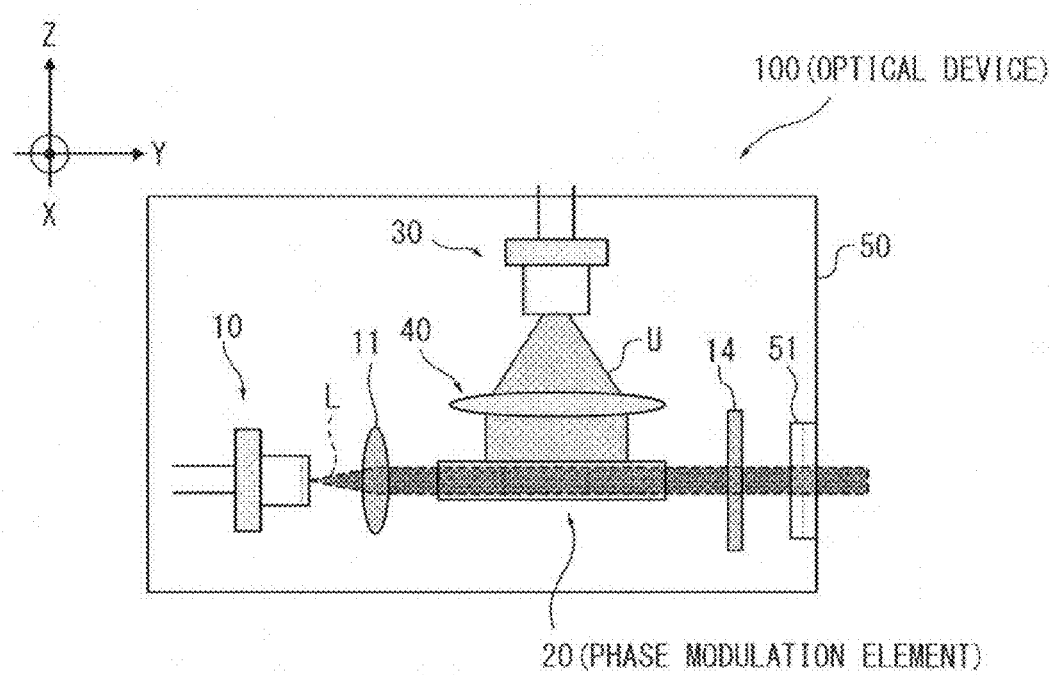
FIGS. 12A and 12B are schematic diagrams of an example of an optical modulation device for which the optical device shown in FIG. 1 is used.
Figure 12B:
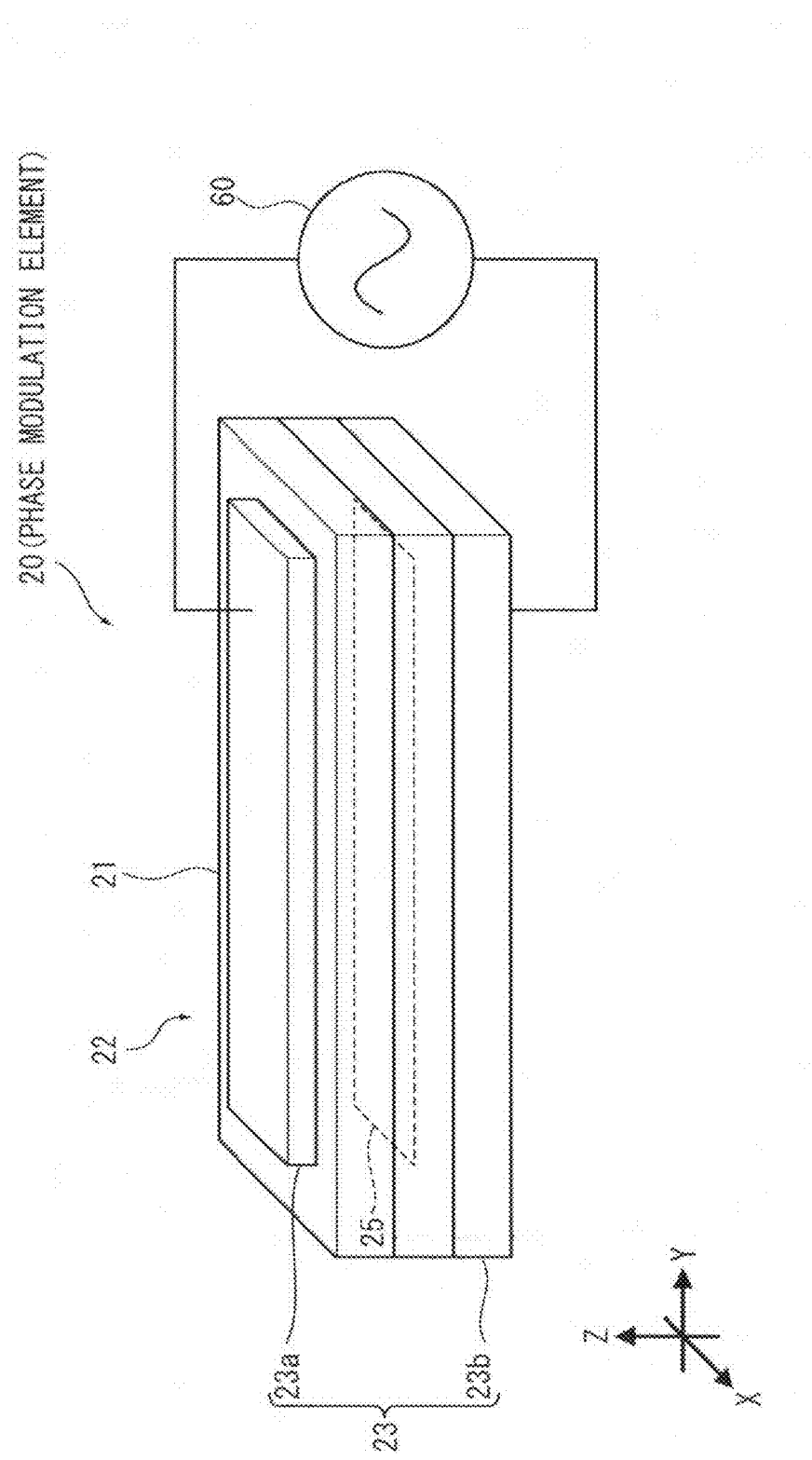

FIGS. 12A and 12B show a configuration example of the optical device 100 employed as an optical modulation device.

The phase modulation element 20 outputs the laser light beam L inputted to the optical waveguide layer 21 after changing the intensity of the laser light beam L through the refractive index modulation region 25 formed inside the optical waveguide layer 21 by application of a voltage thereto through the electrodes 23. Thus, the phase modulation element 20 functions as an optical modulation element.

The light source 10 is a laser diode. The laser light beam L has $\lambda 650$ nm, and its polarization direction is XY 45°. The electrodes 23 are rectangular and formed by integrally forming ITO on the upper and lower surfaces of the optical waveguide layer 21. Thus, the refractive index modulation region 25 is rectangular, as well. The size of the phase modulation element 20 is (X, Y, Z)=(5 mm, 24 mm, 0.3 mm), and the size of the electrode is (X, Y, Z)=(3 mm, 20 mm, 0.0002 mm).

As optical elements, the optical device 100 includes a lens 13 between the light source 10 and the phase modulation element 20 and a polarizer 14 between the phase modulation element 20 and the output hole 51. Note that this optical device 100 may include clad layers as shown in FIGS. 4 and 7, and may include a support board, an adhesion layer, and an extraction electrode as shown in FIG. 7. Although an AC power supply is shown as the power supply 60 in FIGS. 12A, 12B to be able to support various degrees of optical modulation, a DC power supply may also be used as the power supply 60 if only a fixed degree of optical modulation is needed.

The lens 13 has a focal length f of 10 mm, and collimates the laser light beam L and inputs the collimated beam into the phase modulation element 20 functioning as an optical modulation element. The polarizer 14 is set to XY −45°, and is configured to modulate the intensity of light transmitted through the polarizer 14 according to the voltage applied to the phase modulation element 20.

Figure 13:
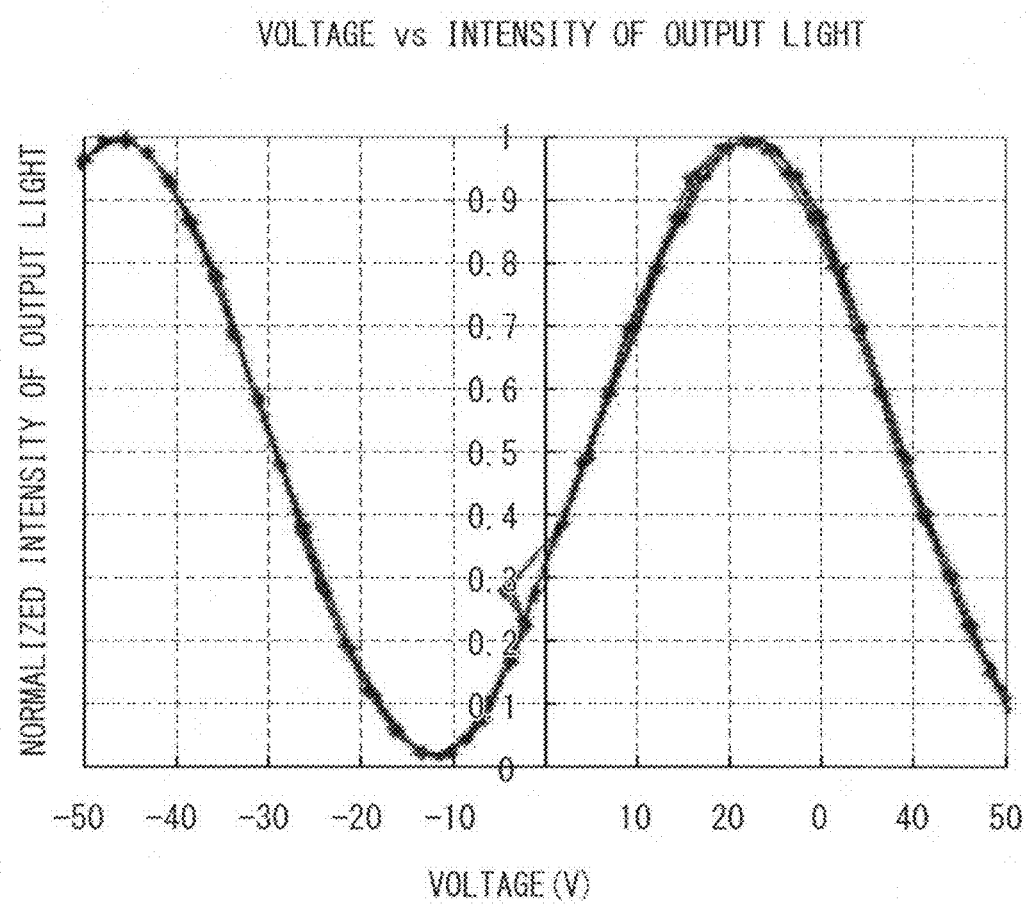
FIG. 13 shows results of performance evaluation of the optical device shown in FIGS. 12A, 12B.

FIG. 13 shows the results of performance evaluation of the optical modulator (i.e., the optical device 100) shown in FIGS. 12A, 12B. In FIG. 13, the horizontal axis indicates a voltage applied to the electrodes 23, and the vertical axis indicates a normalized value of the intensity of light outputted from the output hole 51. It can be seen from FIG. 13 that the optical modulator has a favorable profile result in which the operating voltage for performing the optical modulator ion is about 30 V, and the extinction ratio is 1000:1.

Although preferred embodiments of the present invention have been described above, the present invention is not limited to a particular embodiment. Unless otherwise limited in the above description, various modifications and changes can be made within the scope of the concept of the present invention described in the claims.

For example, the intensity, wavelength, and the like of the pump light beam can be appropriately changed as long as it is effective against photo refraction.

The optical device, the optical deflection device, and the optical modulation device to which the present invention is applied can be used in a variety of fields, such as a laser printer, laser processing, a display, measurement, and optical communication.

The effects described in the embodiments of the present invention are merely a list of most preferred effects offered by the present invention, and the effects of the present invention are not limited to what is described in the embodiments of the present invention.

The embodiment of the present invention provides an optical device comprising: a phase modulation element including an optical waveguide part and electrodes, the optical waveguide part being configured such that a laser light beam emitted by a laser light source is inputted to the optical waveguide part and having an optical waveguide layer formed of an electro-optic material, the electrodes being provided on respective sides of the optical waveguide part to apply a voltage to the optical waveguide layer, the phase modulation element being configured to modulate a phase of the laser light beam by using a refraction index modulation region formed in the optical waveguide layer when a voltage is applied to the optical waveguide layer through the electrodes; and a pump light source configured to irradiate at least the refraction index modulation region of the optical waveguide layer with a pump light beam for cancelling a space-charge electric field formed by drift carriers generated in the optical waveguide layer when a voltage is applied to the optical waveguide layer through the electrodes. Accordingly, the embodiment of the present invention can provide an optical device capable of, by applying the pump light beam to the refractive index modulation region, suppressing beam distortion of the laser beam caused in the refractive index modulation region formed in the optical waveguide layer when a voltage is applied to the optical waveguide layer through the electrodes, and thus capable of outputting a beam having a favorable profile from the phase modulation element.

What is claimed is:

1. An optical device comprising:
   a phase modulation element including an optical waveguide part and electrodes, the optical waveguide part being configured such that a laser light beam emitted by a laser light source is inputted to the optical waveguide part and having an optical waveguide layer formed of an electro-optic material, the electrodes being provided on respective sides of the optical waveguide part to apply a voltage to the optical waveguide layer, the phase modulation element being configured to modulate a phase of the laser light beam by using a refraction index modulation region formed in the optical waveguide layer when a voltage is applied to the optical waveguide layer through the electrodes; and
   a pump light source configured to irradiate at least the refraction index modulation region of the optical waveguide layer with a pump light beam for cancelling a space-charge electric field formed by drift carriers generated in the optical waveguide layer when a voltage is applied to the optical waveguide layer through the electrodes.

2. The optical device according to claim 1, wherein
   the pump light source causes the pump light beam to be transmitted through one of the electrodes and to be applied to at least the refractive index modulation region.

3. The optical device according to claim 2, wherein
   the electrode through which the pump light beam is transmitted is transparent with respect to the pump light beam.

4. The optical device according to claim 1, wherein
   the optical waveguide part includes clad layers between the optical waveguide layer and the respective electrodes.

5. The optical device according to claim 1, wherein
   the phase modulation element integrally includes a support board at its side opposite to a side irradiated with the pump light beam.

6. An optical deflection device comprising the optical device according to claim 1, wherein the laser light beam inputted to the optical waveguide layer is deflected by the phase modulation element to be outputted.

7. The optical deflection device according to claim 6, wherein
   the refractive index modulation region has a prismatic shape, and
   a plurality of the refractive index modulation regions are arranged in the optical waveguide layer in a travel direction of the laser light beam.

8. The optical deflection device according to claim 7, wherein
   areas of the refractive index modulation regions progressively increase downstream in the travel direction.

9. An optical modulation device comprising the optical device according to claim 1, wherein
   the laser light beam inputted to the optical waveguide layer is changed in intensity by the phase modulation element to be outputted.

* * * * *

UNITED STATES PATENT AND TRADEMARK OFFICE
CERTIFICATE OF CORRECTION

PATENT NO. : 8,620,117 B2  
APPLICATION NO. : 13/705544  
DATED : December 31, 2013  
INVENTOR(S) : Jun Nakagawa et al.

Page 1 of 1

It is certified that error appears in the above-identified patent and that said Letters Patent is hereby corrected as shown below:

On the title page, Item (30), the Foreign Application Priority Data Information is incorrect. Item (30) should read:

--(30)      Foreign Application Priority Data

Dec. 6, 2011    (JP)..........................2011-266701  
    Oct. 2, 2012    (JP)..........................2012-220054--

Signed and Sealed this  
Twenty-fifth Day of March, 2014

Michelle K. Lee  
*Deputy Director of the United States Patent and Trademark Office*